United States Patent
Harada et al.

(10) Patent No.: US 9,891,731 B2
(45) Date of Patent: Feb. 13, 2018

(54) TOUCH PANEL, METHOD OF PRODUCING THE SAME, OPTICAL THIN FILM SUBSTRATE AND METHOD OF PRODUCING THE SAME

(71) Applicant: ULVAC, Inc., Chigasaki-shi (JP)

(72) Inventors: Manabu Harada, Chigasaki (JP);
Atsuhito Ihori, Chigasaki (JP);
Toshihiro Suzuki, Chigasaki (JP);
Hidenori Yanagitsubo, Chigasaki (JP);
Masahiro Matsumoto, Chigasaki (JP);
Masashi Kubo, Chigasaki (JP);
Makoto Arai, Chigasaki (JP)

(73) Assignee: ULVAC, INC., Chigasaki-Shi (JP)

( * ) Notice: Subject to any disclaimer, the term of this patent is extended or adjusted under 35 U.S.C. 154(b) by 0 days.

(21) Appl. No.: 14/647,034

(22) PCT Filed: Jul. 10, 2014

(86) PCT No.: PCT/JP2014/068458
§ 371 (c)(1),
(2) Date: May 22, 2015

(87) PCT Pub. No.: WO2015/005437
PCT Pub. Date: Jan. 15, 2015

(65) Prior Publication Data
US 2016/0109971 A1    Apr. 21, 2016

(30) Foreign Application Priority Data
Jul. 11, 2013    (JP) .................................. 2013-145755

(51) Int. Cl.
*G06F 3/041*    (2006.01)
*G02B 5/26*    (2006.01)
(Continued)

(52) U.S. Cl.
CPC ............... *G06F 3/041* (2013.01); *G02B 5/26* (2013.01); *G02B 5/22* (2013.01); *G02B 5/286* (2013.01);
(Continued)

(58) Field of Classification Search
CPC .......... G06F 3/041; G02B 1/11; B81B 3/0083
(Continued)

(56) References Cited

U.S. PATENT DOCUMENTS

2006/0209386 A1* 9/2006 Sudak .................... B81B 3/0083
359/291
2008/0165139 A1* 7/2008 Hotelling ................ G06F 3/041
345/173
(Continued)

FOREIGN PATENT DOCUMENTS

CN    102810020    12/2012
CN    103049119    4/2013
(Continued)

OTHER PUBLICATIONS

Office Action from related Korean Appln. No. 10-2015-7014085 dated Mar. 4, 2016. English translation attached.
(Continued)

*Primary Examiner* — Kumar Patel
*Assistant Examiner* — Kuo Woo
(74) *Attorney, Agent, or Firm* — Grossman, Tucker, Perreault & Pfleger, PLLC

(57) ABSTRACT

A touch panel of the present invention includes: a cover substrate; a connector being provided on an area of the cover substrate other than a display area, and including a color layer and a shield layer, the shield layer being formed from a multilayer structure, the multilayer structure being configured so that a metal layer and a dielectric layer which is thicker than the metal layer are alternately laminated; and a
(Continued)

touch panel substrate being arranged to face the cover substrate with the connector interposed therebetween.

9 Claims, 3 Drawing Sheets

(51) Int. Cl.
*G02B 5/22* (2006.01)
*G02B 5/28* (2006.01)

(52) U.S. Cl.
CPC .............. *G06F 2203/04103* (2013.01); *G06F 2203/04107* (2013.01)

(58) Field of Classification Search
USPC .................... 345/173; 359/359, 291; 349/110
See application file for complete search history.

(56) References Cited

U.S. PATENT DOCUMENTS

| | | | |
|---|---|---|---|
| 2012/0154725 A1* | 6/2012 | Jeon .................... | G02F 1/13338 349/110 |
| 2013/0100039 A1* | 4/2013 | Hong .................. | B32B 37/1207 345/173 |
| 2013/0162570 A1* | 6/2013 | Shin ........................ | G06F 3/041 345/173 |
| 2014/0320956 A1* | 10/2014 | Taka ........................ | G02B 1/11 359/359 |
| 2016/0109971 A1 | 4/2016 | Harada et al. | |

FOREIGN PATENT DOCUMENTS

| | | |
|---|---|---|
| CN | 103092379 | 5/2013 |
| CN | 103176302 | 6/2013 |
| CN | 203025672 | 6/2013 |
| JP | 2000105537 | 4/2000 |
| JP | 2001201745 | 7/2001 |
| JP | 2008-145664 | 6/2008 |
| JP | 2009-051133 | 3/2009 |
| JP | 2011-129110 | 6/2011 |
| JP | 2012226688 | 11/2012 |
| JP | 2013131099 | 7/2013 |
| JP | 2013-152639 | 8/2013 |
| JP | 2013-245151 | 12/2013 |
| KR | 20100040114 | 4/2010 |
| KR | 20120067031 | 6/2012 |
| KR | 20120134955 | 12/2012 |
| NO | 2013/089066 | 6/2013 |
| WO | 2015/005437 | 1/2015 |

OTHER PUBLICATIONS

International Search Report from related PCT Application Na PCT/JP2015/062859 dated Jun. 30, 2015. English translation attached.

Office Action from related Chinese Appln. No. 201480003204.9, dated Nov. 16, 2016. English translation attached.

International Search Report from corresponding PCT Application No. PCT/JP2014/068458 dated Aug. 19, 2014. English translation attached.

* cited by examiner

US 9,891,731 B2

TOUCH PANEL, METHOD OF PRODUCING THE SAME, OPTICAL THIN FILM SUBSTRATE AND METHOD OF PRODUCING THE SAME

TECHNICAL FIELD

The present invention relates to a technique preferably used for a touch panel, a method of producing the same, an optical thin film substrate, and a method of producing the optical thin film substrate.

Priority is claimed on Japanese Patent Application No. 2013-145755, filed on Jul. 11, 2013, the contents of which are incorporated herein by reference.

BACKGROUND ART

In recent years, as a display unit of various electronic devices including mobile phones and hand-held gaming machines, a liquid crystal display with a touch panel which also has a function of an input device is widely used.

The touch panel has a touch panel substrate in which optically-transparent conductive layers or the like are laminated on a transparent substrate and in which a stack of films are formed on the outmost surface side thereof. The touch panel substrate detects an operation position of a finger or the like by a change in capacitance or the like.

Based on the structures and detection systems, touch panels are categorized into various types such as a resistance film type touch panels and a capacitance type touch panels.

For example, a touch panel substrate that is provided with an upper substrate and a lower substrate which are film-shaped and have optical transparency is known. On the top surface of the upper substrate, a plurality of substantially band-shaped upper conductive layers made of a material with optical transparency such as indium tin oxide are formed so as to be arranged in the front-rear direction. Furthermore, on the layers of the indium tin oxide or the like, a plurality of upper electrodes in which conductive metal foil such as copper or silver are stacked by vapor deposition or the like are formed in the left-right direction, which is a direction orthogonal to that of the upper conductive layers. On the top surface of the lower substrate, a plurality of substantially band-shaped lower conductive layers made of a material with optical transparency such as indium tin oxide are formed so as to be arranged in the left-right direction, which is a direction orthogonal to that of the upper conductive layers. Furthermore, a plurality of lower electrodes, which are similar to the upper electrodes and first ends of which are coupled to edges of the lower conductive layers, are formed in the left-right direction parallel with that of the lower conductive layers.

In addition, to the touch panel substrate, a film-shaped cover substrate with optical transparency is attached with an adhesive so as to overlap the top surface of the upper substrate.

FIG. 5 is a cross-sectional view of a conventional touch panel. In FIG. 5, reference symbol P denotes a touch panel substrate, and reference symbol C denotes a cover substrate. On a surface of the cover substrate C which faces the touch panel substrate P, there is provided a light shielding film th with optical opacity in an edge region E positioned along an outer circumference of or outside of a touch area (display area) T on which touch operation is performed.

It is known that the light shielding film th is formed so as to have a thickness of approximately 5 μm to 20 μm on the cover substrate C by printing or the like, as shown in Patent Document 1.

PRIOR ART DOCUMENTS

Patent Documents

Patent Document 1: Japanese Unexamined Patent Application, First Publication No. 2012-226688

SUMMARY OF THE INVENTION

Problems to be Solved by the Invention

However, when the light shielding film th with optical opacity in the edge region E is formed on the surface of the cover substrate C which faces the touch panel substrate P is formed by printing so as to have a thickness dimension approximately as described above, a gap is produced between the cover substrate C and the touch panel substrate P, as shown as Air in FIG. 5. As a result, reflections occur on the rear surface of the cover substrate C and the front surface of the touch panel substrate P. This lowers visibility. The lowering of visibility leads to a problem of hindering a decrease in an output of a display means.

Furthermore, if a conductor such as a metal is provided in the edge region E as is the case of Patent Document 1, the edge region E is different in permittivity from the cover substrate C or the panel unit P. This may result in a deterioration of properties such as radio wave characteristics, and hence, is not preferable.

The present invention has been made in view of the above circumstances and tries to achieve the following.
1. to prevent the lowering of visibility.
2. to make the edge region thinner.
3. to allow the edge region to have the same permittivity as that of a substrate that is formed from glass or the like while the edge region remains having light shielding capability.

Means for Solving the Problems

A touch panel according to a first aspect of the present invention includes: a cover substrate; a connector being provided on an area of the cover substrate other than a display area, and including a color layer and a shield layer, the shield layer being formed from a multilayer structure, the multilayer structure being configured so that a metal layer and a dielectric layer which is each thicker than the metal layer are alternately laminated; and a touch panel substrate being arranged to face the cover substrate with the connector interposed therebetween.

In the first aspect as described above, the color layer may be formed from a multilayer structure configured so that a high refractive index layer and a low refractive index layer are alternately laminated.

In the first aspect as described above, at least one of the low refractive index layer and the high refractive index layer may include a metal element.

A method of producing a touch panel according to a second aspect of the present invention includes: preparing a cover substrate; forming a color layer on an area of the cover substrate other than a display area in a vacuum: forming a shield layer on the color layer in a vacuum, the shield layer having a multilayer structure obtained by alternately laminating a dielectric layer and a metal layer so that the dielectric layer is thicker than the metal layer; and adhering a touch panel substrate onto the shield layer.

An optical thin film substrate according to a third aspect of the present invention includes: a substrate; a color layer being provided on the substrate; and a shield layer being provided on the color layer and formed from a multilayer structure configured so that a metal layer and a dielectric layer, which is each thicker than the metal layer are alternately laminated.

In the third aspect of the present invention, the color layer may be formed from a multilayer structure configured so that a high refractive index layer and a low refractive index layer are alternately laminated.

In the third aspect of the present invention, at least one of the low refractive index layer and the high refractive index layer may include a metal element.

In the third aspect of the present invention, the substrate may be a glass substrate or a resin substrate.

A method of producing an optical thin film substrate according to a fourth aspect of the present invention includes: preparing a substrate; forming a color layer on the substrate in a vacuum: and forming a shield layer on the color layer, the shield layer having a multilayer structure obtained by alternately laminating a dielectric layer and a metal layer so that the dielectric layer is thicker than the metal layer.

In the touch panel according to the first aspect of the present invention, a touch panel substrate and a cover substrate are arranged to overlap each other. In the touch panel according to the first aspect of the present invention include a connector provided in an area other than a display area between the touch panel substrate and the cover substrate.

In the touch panel according to the first aspect of the present invention, the connector includes: a color layer and a shield layer that are laminated from the cover substrate towards the touch panel substrate. The shield layer is formed from a multilayer structure in which a dielectric layer and a metal layer are alternately laminated. This makes it possible to decrease the thickness of the connector provided around the display area and to provide a frame (casing edge) with a desired color outside the display area. As a result, it is possible to prevent formation of a step in the vicinity of the border of the display area between the cover substrate and the touch panel substrate, to thereby prevent a decrease in visibility.

Furthermore, according to the first aspect of the present invention, even if a conductor formed from metal layers is provided in the connector provided in an edge region as described above when the edge region is to be made thinner, the edge region is capable of maintaining the permittivity approximately the same as that of a substrate or glass while being provided with light shielding property because the connector is formed from a multilayer structure in which a dielectric layer and a metal layer are alternately laminated. Therefore, the touch panel does not have an adverse effect on the radio wave characteristics or the like that is important for communication terminals or the like.

In the first aspect of the present invention, the shield layer has metal layers and dielectric layers. This makes it possible to achieve desired light shielding property and permittivity of the shield layer at the same time.

In the first aspect of the present invention, the dielectric layer is thicker than the metal layer in the shield layer. This makes it possible to achieve a desired light shielding property and permittivity of the shield layer at the same time.

Furthermore, since the color layer is formed from a multilayer structure in which high refractive index layers and low refractive index layers are alternately laminated, or at least one of the low refractive index layer and the high refractive index layer in the color layer includes a metal element, it is possible to achieve desired light shielding property and permittivity of the shield layer at the same time.

A method of producing a touch panel according to a second aspect of the present invention is a method of producing a touch panel in which a touch panel substrate and a cover substrate are arranged to overlap each other and which has a connector, the connector being provided between the substrates in an area other than a display area and also being made of a color layer and a shield layer.

The method of producing a touch panel according to the second aspect of the present invention has a step of forming, in a vacuum, the shield layer as a multilayer structure in which a dielectric layer and a metal layer are alternately laminated. In the step of forming the shield layer, the dielectric layers and the metal layers are laminated so that the dielectric layer is thicker than the metal layer. As a result, it is possible to reduce in thickness the connector provided around the display area, and to produce a touch panel in which a frame (casing edge) with a desired color is provided outside the display area. Therefore, it is possible to produce a touch panel capable of preventing formation of a step in the vicinity of the border of the display area between the cover substrate and the touch panel substrate, to thereby prevent a decrease in visibility. Furthermore, according to the method of producing a touch panel of the second aspect of the present invention, even if a conductor formed from metal layers is provided in the connector provided in the edge region, the edge region is capable of maintaining substantially the same permittivity as that of a substrate or glass while being provided with light shielding property because the connector is formed from a multilayer structure in which the metal layers and dielectric layers thicker than the metal layer are alternately laminated. Furthermore, it is possible to achieve a desired light shielding property and permittivity of the shield layer. Therefore, it is possible to produce a touch panel that does not have an adverse effect on radio wave characteristics or the like.

In the case where an optical thin film substrate according to a third aspect of the present invention is used also in a touch panel, it is possible to reduce the thickness of the connector provided around a display area, and to provide a frame (casing edge) with desired color outside the display area. As a result, it is possible to prevent formation of a step in the vicinity of the border of the display area between the cover substrate and the touch panel substrate, to thereby prevent a decrease in visibility.

In the third aspect of the present invention, the shield layer has a metal layer and a dielectric layer. Therefore, it is possible to achieve a desired light shielding property and permittivity of the shield layer at the same time.

In the third aspect of the present invention, the dielectric layer is thicker than the metal layer in the shield layer. This makes it possible to achieve a desired light shielding property and permittivity of the shield layer.

In the third aspect of the present invention, since the color layer is formed from a multilayer structure in which high refractive index layers and low refractive index layers are alternately laminated, or at least one of the low refractive index layer and the high refractive index layer in the color layer includes a metal element, it is possible to achieve desired light shielding property and permittivity of the shield layer at the same time.

A method of producing an optical thin film substrate according to a fourth aspect of the present invention has a step of forming, in a vacuum, the shield layer formed from a multilayer structure in which a dielectric layer and a metal layer are alternately laminated. In the step of forming the shield layer, the dielectric layer is laminated dielectric layer to be thicker than the metal layer. As a result, in the case where the produced optical thin film substrate is used in a touch panel, it is possible to reduce in thickness the connector provided around a display area, and to produce a touch panel in which a frame (casing edge) with a desired color is provided outside the display area. Therefore, it is possible to produce a touch panel capable of preventing a step from being formed in the vicinity of the border of the display area between the cover substrate and the touch panel substrate, to thereby prevent a decrease in visibility. Furthermore, according to the method of producing an optical thin film substrate of the fourth aspect of the present invention, even if a conductor formed from metal layers is provided in the connector provided in the edge region, the edge region is capable of maintaining substantially the same permittivity as that of a substrate or glass while being provided with light shielding property because the connector is formed from a multilayer structure in which the metal layer and the dielectric layer which is thicker than the metal layer are alternately laminated. Furthermore, it is possible to achieve the desired light shielding property and permittivity of the shield layer. Therefore, it is possible to produce a touch panel that does not have an adverse effect on radio wave characteristics or the like.

Effects of the Invention

According to the above aspects of the present invention, it is possible to provide a touch panel and an optical thin film substrate that are capable of preventing the lowering of visibility, of making the edge region (connector) thinner, and of making the edge region have the same permittivity as that of a substrate formed from glass or the like while the edge region maintains light shielding capability.

DETAILED DESCRIPTION OF THE INVENTION

Hereunder is a description of a touch panel according to an embodiment of the present invention with reference to the drawings.

Figure 1A:
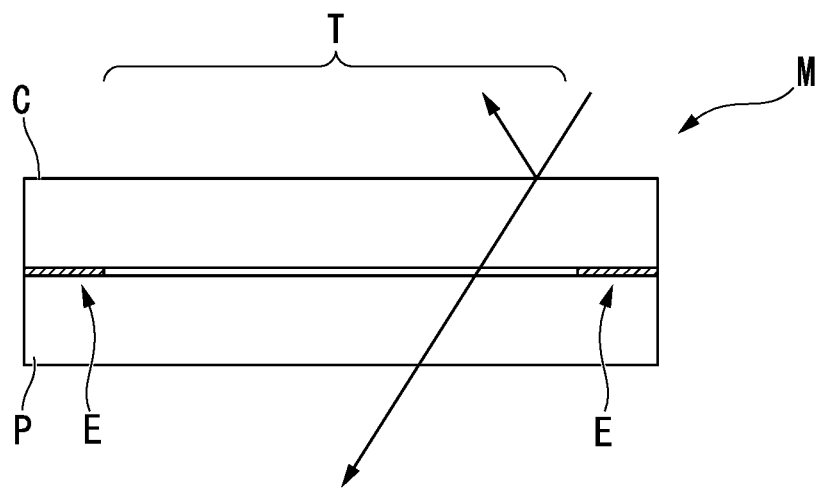
FIG. 1A is a cross-sectional view showing a touch panel according to a first embodiment of the present invention.
Figure 1B:
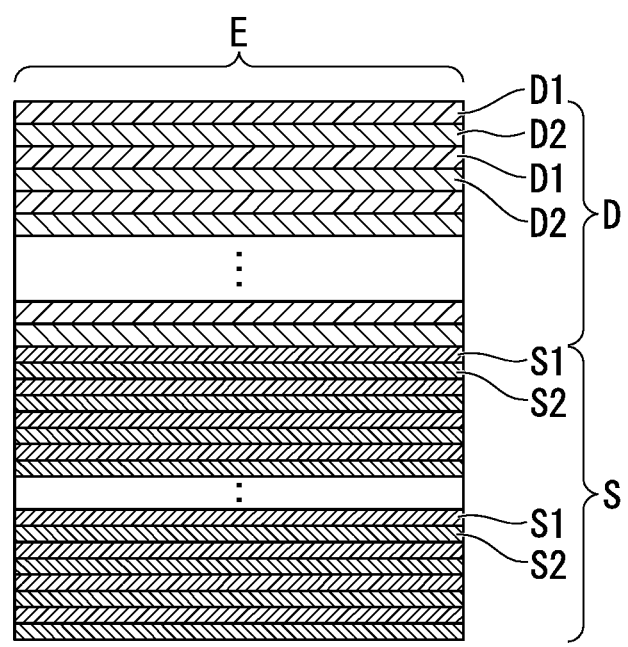
FIG. 1B is an enlarged cross-sectional view showing an edge region of the touch panel according to the first embodiment of the present invention.
Figure 2:
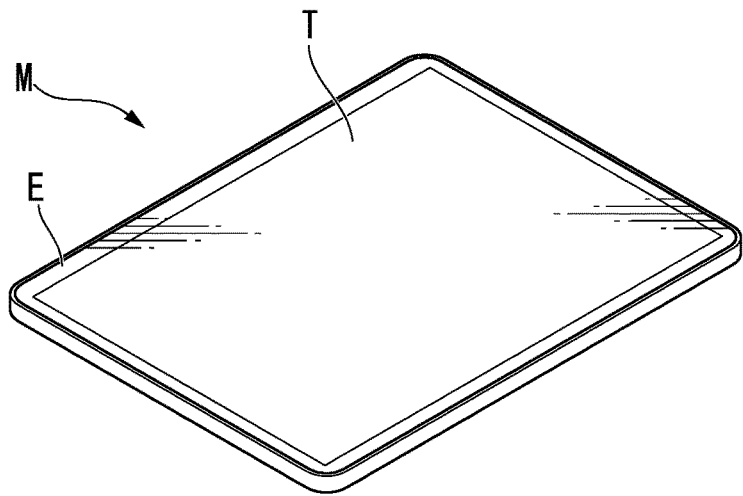
FIG. 2 is a perspective view showing the touch panel according to the first embodiment of the present invention.

FIG. 1A is a cross-sectional view showing the touch panel of the present embodiment. FIG. 1B is an enlarged cross-sectional view of an edge region of the touch panel of the present embodiment. FIG. 2 is a perspective view showing the touch panel of the present embodiment. In FIGS. 1A and 2, reference symbol M denotes the touch panel.

In the touch panel M of the present embodiment, a touch panel substrate P, which has a display area T and on which display and touch operation is available, and a cover substrate C which is formed from a transparent substrate such as glass, are arranged to overlap each other, as shown in FIGS. 1A and 2. Between the touch panel substrate P and the cover substrate C, a connector is provided in an edge region E which is around a display area T and which is other than the display area T.

The touch panel substrate P may be used for mobile terminals such as mobile phones. The touch panel substrate P may have a structure in which a touch panel sensor section and a liquid crystal display unit are combined. Furthermore, the touch panel substrate P may have a structure in which, in a display unit provided with a transparent touch switch and liquid crystal display element, a transparent adhesive is filled between a display surface of the liquid crystal display element and a rear surface of an input area of the touch switch, to thereby bond the touch switch and the liquid crystal display element. Furthermore, the touch panel substrate P may have a structure of an image display unit with a touch panel in which boundary faces of a display panel and a touch panel are brought into close contact with each other via an adhesive layer and, hence, integrated. Furthermore, the touch panel substrate P may have a structure other than these, and may also have any of the various types of structure such as a projected capacitance type structure, a resistive film type structure, and a capacitance type structure.

The cover substrate C is a transparent substrate made of, for example, glass or resin laminated glass, and is placed on the touch panel substrate P so as to cover the outmost surface of the touch panel M.

The display area T has an area with a predetermined size and shape in a substrate surface direction which is orthogonal to the viewing direction. For example, the display area T may have a rectangular area arranged at the central position within the surface of the touch panel substrate P.

An external area of the display area T within the substrate surface is an edge region (casing edge region) E. In the edge region E, a color layer D and a shield layer S are stacked from the cover substrate C to the touch panel substrate P. The color layer D and a shield layer S function as a connector which makes predetermined color(s) recognizable when the touch panel M is visually recognized and which is connected to (come into contact with) both of the cover substrate C and the touch panel substrate P.

As the connector, the color layer D is stacked on the surface of the cover substrate C which faces the touch panel substrate P. Then, on the color layer D, the shield layer S is stacked. The position at which the connector is provided is not limited to the edge region E, and the connector may be formed in a desired area.

The color layer D is a film with optical opacity (light shielding property), and is also an optical thin film formed of multiple layers with different refractive indexes. To be more specific, the color layer D is a multilayer structure in which a high refractive index layer D1 formed from a material with a high refractive index and a low refractive index layer D2 formed from a material with a low refractive index are alternately and multiply laminated.

The high refractive index layer D1 may be formed from a material with high refractive index such as titanium oxide. The low refractive index layer D2 may be formed from a material with low refractive index such as silicon oxide. It is required only the material with a high refractive index and the material with a low refractive index should be different from each other in refractive index. As for the film thickness and the number of layers, for example, lamination of n thin films with a thickness of $\lambda/4$ for the wavelength $\lambda$, which is desired to be expressed by the color layer D, makes it possible to realize the desired color. The number of laminated layers can be set smaller as the difference of the refractive index between the material with a high refractive index and the material with a low refractive index increases.

Materials for dielectric films that form the high refractive index layer D1 and the low refractive index layer D2 may be selected from the exemplary materials listed below. Furthermore, two or three of these may be selected and combined. Here, whether the material has high or low of refractive index is determined by comparing the selected materials. Depending on the combination of the materials, whether the material has a low refractive index or a high refractive index may vary.

Materials with a low refractive index: $SiO_x$, $SiN$, $SiO_xN_y$, $Al_2O_3$, $AlN$, $MgO$, $MgF_2$, and $HfO_2$ Materials with a high refractive index: $Ta_2O_5$, $Nb_xO_y$, $TiO_2$, $Ti_3O_5$, $ZnO$, and $ZrO_2$ For example, among the above materials, a combination of: silicon oxide (n=1.46) as a material with a low refractive index; and titanium oxide (n=2.4) as a material with a high refractive index may be selected.

Furthermore, as an example of a color layer C, exemplary settings of the film thickness and the number of layers for four colors of: red, yellow, blue, and green are shown in Table 1.

TABLE 1

|  | $SiO_2$ | | $TiO_2$ | |
| --- | --- | --- | --- | --- |
|  | Film thickness (nm) | Number of layers | Film thickness (nm) | Number of layers |
| Red | 118.1 | 5 | 71.57 | 5 |
| Yellow | 102.8 | 3 | 61.5 | 3 |
| Blue | 70.1 | 5 | 39.3 | 5 |
| Green | 83.9 | 4 | 48.9 | 4 |

Thus, it is possible to set the low refractive index layer D2 to be thicker than the high refractive index layer D1 so that the low refractive index layer D2 has a thickness of approximately 100 nm and the high refractive index layer D1 has a thickness of approximately ⅔ to ½ of that of the low refractive index layer D2.

The shield layer S is a film with optical opacity (light shielding property), and is also a film whose permittivity is approximately the same as that of a substrate of glass or the like and does not shield radio waves. To have desired permittivity, the shield layer S is a multilayer structure in which multiple layers with different permittivity are alternately laminated. To be more specific, metal layer S1 formed from a low dielectric material and dielectric layer S2 formed from a high dielectric material are multiply laminated.

The metal layer S1 may be formed from a material such as metal, for example, titanium or aluminum. The dielectric layer S2 may be formed from a high dielectric material such as silicon oxide. The layer of the dielectric material and the layer of the metal material are alternately laminated, and the constituent material, the film thickness, and the number of laminated layers for each of the metal layer S1 and the dielectric layer S2 are set so that the shield layer S is in a desired state where the shield layer S has the same permittivity as that of a substrate of glass or the like without allowing visible light to pass therethrough.

A dielectric material may be selected from the exemplary materials shown above as the materials for dielectric films for the color layer D. Furthermore, two or three of these may be selected and combined.

A metal material may be selected from the materials below in consideration of the properties of the shielding property and the permittivity. Also, among these, two or three kinds may be selected and combined.

Metal materials: Si, Ti, Ta, Nb, Al, Ag, Mg, Sb, Zr, Zn, Sn, Ca, Au, Cr, Ge, In, Ni, and Pt Especially in order for the shield layer to be capable of shielding visible light and, at the same time, not to shield radio waves, each of the metal layers S1 constituting the shield layer is set to be formed with a thickness on the order of nm, and the metal layer S1 is set to have a thickness less than that of the dielectric layer S2. Furthermore, the total thickness of the laminated metal layers S1 is set to be greater than the minimum value of a film thickness that is required to prevent visible light from passing therethrough.

As shielding capability, the transmittance may be set to 1% or less within the range of visible light. To be more specific, the total thickness of the metal layers S1 is required to be approximately 50 nm.

Furthermore, the total thickness of the laminated dielectric layers S2 is set to be greater than the minimum value of a film thickness that is required to maintain the state where the radio waves are not shielded. To be more specific, the total thickness of the dielectric layers S2 is required to be approximately 200 nm.

Note that, according to the above color layer D, the number of laminations of the metal layers S1 and the dielectric layers S2 may be modified.

As an example of the shield layer S, examples of the film thickness and the number of layers are shown that are capable of realizing a permittivity of 3.5 to 10 ($\in$s), which is the same as that of glass.

TABLE 2

|  | $SiO_2$ | | Ti | |
| --- | --- | --- | --- | --- |
|  | Film thickness (nm) | Number of layers | Film thickness (nm) | Number of layers |
| Shielding layer | 4 | 50 | 1 | 50 |

Thus, it is possible to set the dielectric layer S2 greater in thickness than the metal layer S1 so that the metal layer S1 has a thickness of 0.5 nm to 5 nm and that the dielectric layer S2 has a thickness of 1 nm to 10 nm, which is approximately 2 to 10 times that of the metal layer S1.

Furthermore, by laminating multiple layers of titanium and silicon oxide as the color layer D similarly to the shield layer S, it is possible to obtain the color black. Alternatively, by laminating multiple layers of aluminum and silicon oxide, it is possible to obtain the color silver.

Thus, by forming a connector in which the color layer D and the light shielding layer S are stacked as an optical thin film of the present embodiment, it is possible to set the total thickness of the connector to 500 nm or less for the case of the color black and to 1.5 to 2 μm for the color red.

Furthermore, it is possible to form a such connector by sputtering without using a wet step such as a printing step (print step).

Next is a description of a method of producing the touch panel according to the present embodiment.

Figure 3:
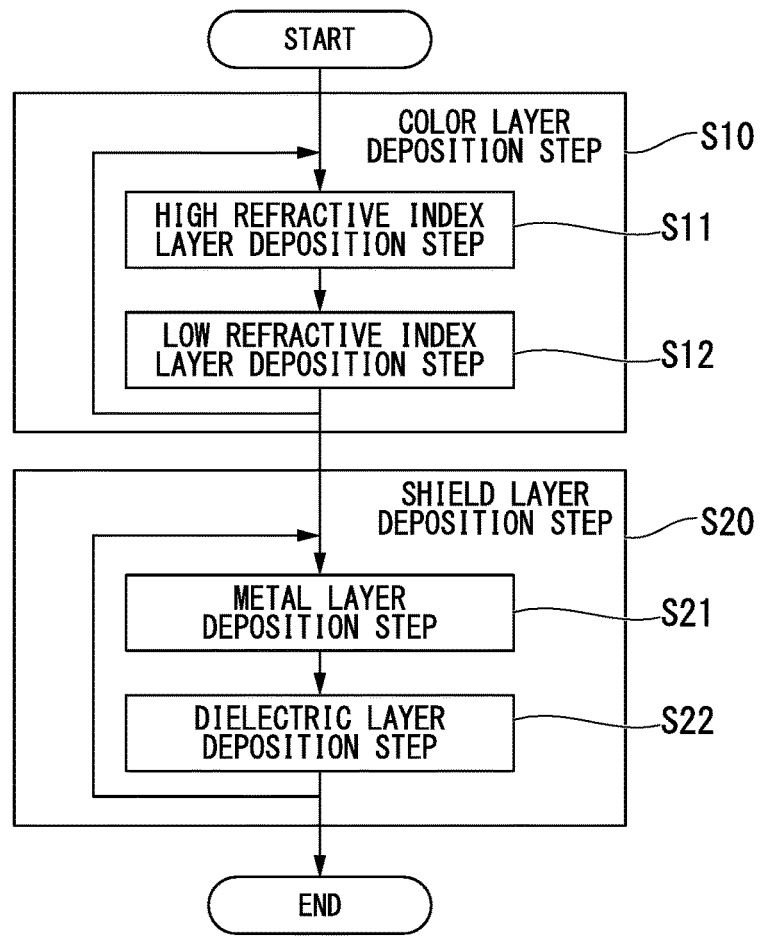
FIG. 3 is a process chart showing a method of producing a touch panel according to the first embodiment of the present invention.

FIG. 3 is a flow chart showing the method of producing the touch panel according to the present embodiment.

In the method of producing the touch panel according to the present embodiment, a cover substrate C formed from glass is prepared. On the cover substrate C in which a display area T is provided with a mask, a color layer D is deposited in a color layer deposition step S10 as shown in FIG. 3. After that, in a shield layer deposition step S20, a shield layer S is deposited. After that, the mask is removed, and then, the cover substrate C (optical thin film substrate) in which the color layer D and the shield layer S are stacked is attached to a touch panel substrate.

In the color layer deposition step S10, with materials optionally selected for the color layer D, high refractive index layers D1 and low refractive index layers D2 are laminated so that the color layer D has a predetermined thickness. At this time, a high refractive index layer deposition step S11 and a low refractive index layer deposition step S12 are repeated many times to deposit the color layer D by sputtering.

At this time, the deposition may be performed by using a deposition apparatus, a parallel plate magnetron sputtering apparatus, or the like that is capable of alternatively depositing and laminating two or three materials. As an exemplary apparatus for the present embodiment, a sputtering apparatus of the carousel type is shown in FIG. 4.

Figure 4:
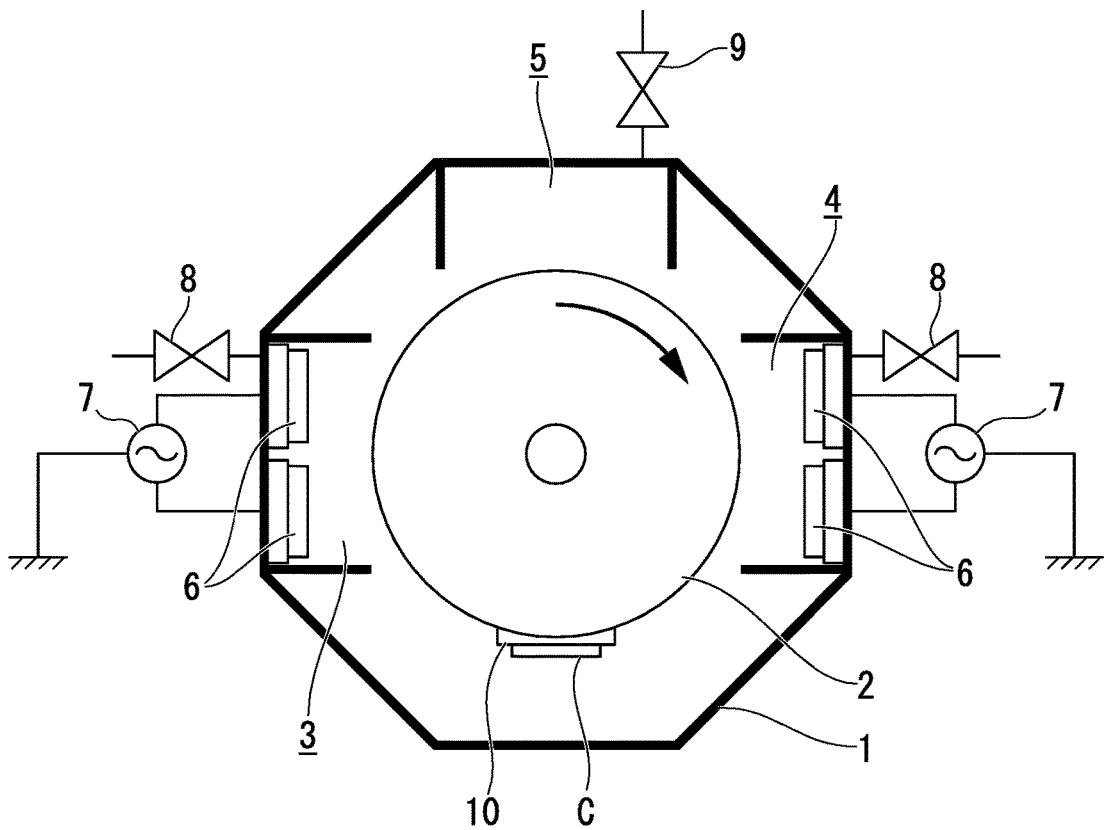
FIG. 4 is a schematic diagram showing an exemplary producing apparatus used for producing the touch panel according to the first embodiment of the present invention.
Figure 5:
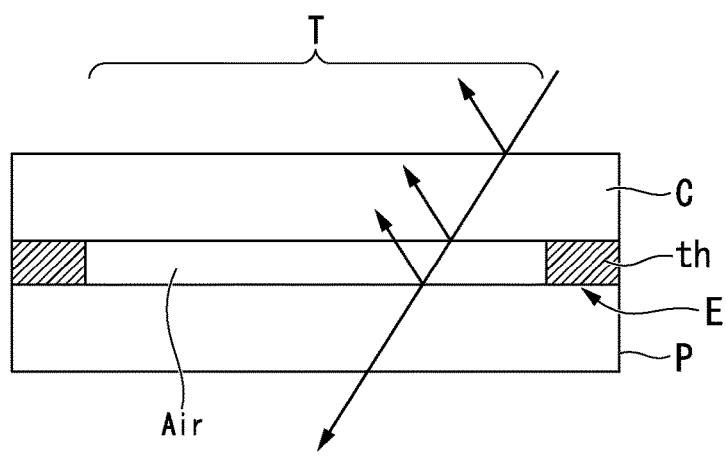
FIG. 5 is a cross-sectional view showing a conventional touch panel.

FIG. 4 is a schematic diagram showing a producing apparatus used to produce an embodiment of the touch panel according to the present embodiment.

The producing apparatus according to the present embodiment is a carousel type sputtering apparatus. As shown in FIG. 4, the producing apparatus according to the present embodiment has: a drum 2 in a chamber 1, the drum 2 rotating with a substrate holder 10 attached thereto; a CA1 chimney 3 and a CA2 chimney 4 that face an outer circumferential surface of the drum 2 and are capable of sputtering different materials; and an oxidation source supply section 5 to which a gas introduction port 9 is connected, the gas introduction port 9 being capable of supplying an oxidation source such as oxygen when reactive sputtering is performed.

As shown in FIG. 4, each of the CA1 chimney 3 and the CA2 chimney 4 is provided with: AC cathodes 6 that are installed at positions around the drum 2 capable of corresponding to the substrate holder 10 on the rotating drum 2 and are also connected to an AC power source 7; and a gas introduction port 8 that supplies a gas such as Ar into the chimney.

To the substrate holder 10, a cover substrate C whose surface section corresponding to a display area T is formed with a mask, or a cover substrate C on which a color layer D is further formed, is attached.

In the color layer deposition step S10, titanium which is titanium oxide source as an example of a material with a high refractive index and silicon which is silicon oxide source as an example of a material with a low refractive index are installed respectively on the cathodes 6 of the CA1 chimney 3 and the CA2 chimney 4. After that, the cover substrate C formed with the mask is fixed to the substrate holder 10 of the drum 2. Furthermore, a gas such as argon is supplied from the gas introduction ports 8. At the same time, an oxidation source such as an oxygen gas is supplied to the oxidation source supply section 5 via the gas introduction port 9, and then the drum 2 is rotated. Under this oxidizing atmosphere, electric power is supplied from the AC power source 7 to the cathodes 6. Thereby, by reactive sputtering, it is possible to deposit silicon oxide in the CA1 chimney 3 and to deposit titanium oxide in the CA2 chimney 4.

In the color layer deposition step S10, with materials optionally selected for the color layer D, the high refractive index layers D1 and the low refractive index layers D2 are laminated so that the color layer D has a predetermined thickness, as shown in FIG. 3.

At this time, the high refractive index layer deposition step S11 and the low refractive index layer deposition step S12 are repeated many times. Thus, a multitude of high refractive index layers D1 formed from a material with a high refractive index and low refractive index layers D2 formed from a material with a low refractive index are alternately laminated.

At this time, by controlling the electric power supplied to the cathodes 6 of the CA1 chimney 3 and the electric power supplied to the cathodes 6 of the CA2 chimney 4 so as to be alternately switched, it is possible to repeat the high refractive index layer deposition step S11 and the low refractive index layer deposition step S12 as many times as required.

In the shield layer deposition step S20, with materials optionally selected for the shield layer S, the metal layers S1 and the dielectric layers S2 are laminated so that the shield layer S has a predetermined thickness, as shown in FIG. 3. At this time, a metal layer deposition step S21 and a dielectric layer deposition step S22 are repeated many times and sputtering deposition is performed so that the shield layer S becomes a multilayer structure.

In the shield layer deposition step S20, titanium as an example of a metal material and silicon as silicon oxide as an example of a dielectric material are installed respectively on the cathodes 6 of the CA1 chimney 3 and the cathodes 6 of the CA2 chimney 4. Then, the cover substrate C formed with the color layer D is fixed to the substrate holder 10 of the drum 2. Under a predetermined atmosphere in which a gas such as argon is supplied from the gas introduction ports 8, electric power is supplied from the AC power sources 7 to the cathodes 6, and the drum 2 is rotated. With this metal sputtering, it is possible to deposit titanium on the color layer D as a metal material.

Furthermore, an oxidation source such as an oxygen gas is supplied to the oxidation source supply section 5 via the gas introduction port 9 to produce an oxidizing atmosphere. Then, electric power is supplied from the AC power sources 7 to the cathodes 6, and the drum 2 is rotated. With this reactive sputtering, it is possible to deposit silicon oxide on the metal layer S1.

At this time, by controlling electric power supplied to the cathodes 6 of the CA1 chimney 3 and the CA2 chimney 4; and supply and no-supply of the oxidation source (oxygen gas) to the oxidation source supply section 5 to be alternately switched, the metal layer deposition step S21 and the dielectric layer deposition step S22 are repeated many times. As a result, a multitude of dielectric layers S2 formed from a dielectric material and metal layers S1 formed from a metal material are alternately laminated.

By switching the target between silicon and titanium in the color layer formation step S10 and the shield layer formation step S20 as described above, it is possible to form a multilayer film in a single chamber.

Furthermore, it is also possible to switch between the reactive sputtering and the metal sputtering by switching between the supply and no-supply of the oxidation source such as an oxygen gas to the oxidation source supply section 5. This makes it possible to consecutively perform the color layer formation step S10 and the shield layer formation step S20. Furthermore, also in the case where metal sputtering is required such as when the color black is set as a color to be generated by the color layer D, it is possible to switch to the metal sputtering.

The touch panel according to the present embodiment has a connector includes: a color layer D that is laminated on the cover substrate C towards the touch panel substrate T; and a shield layer S formed from a multilayer structure in which dielectric layers and metal layers are alternately laminated, as described above. Therefore, the touch panel of the present embodiment generates a desired color in the edge region E while having capability of shielding visible light in the edge region E. The touch panel also maintains the permittivity approximately the same as that of glass in the edge region E, and therefore it is possible to transmit radio waves as well. In addition, it is possible to make the thickness of the connector less than 2 µm. This prevents a gap from being formed between the cover substrate C and the touch panel substrate T. As a result, diffuse reflection is prevented, and thus it is possible to realize a touch panel M with improved visibility.

Example

Hereunder is a description of an example according to an embodiment of the present invention.

In a sputtering apparatus of the carousel type with silicon and titanium as targets 6 as shown in FIG. 4, a drum 2 was rotated at 200 rpm. While the drum 2 was rotated three times, electric power was supplied to the silicon targets. After that, the electrical discharge was stopped, and electric power was supplied to the titanium targets. At this time, an oxygen gas was supplied as an oxidation source to deposit a color layer D on the cover substrate C. Then, a switching was performed so as not to supply the oxygen gas, and a shield layer S was deposited on the color layer D.

To be more specific, the structure of the film was as shown in Table 1 and Table 2.

In the shield layer, the film thickness of titanium as a metal was made to be thinner than the film of silicon oxide. Furthermore, as shown in Table 1, the composition of the film was modified to generate four colors. As a result, with respect to any color, it was possible to form a layer having the same permittivity as that of glass, and also possible to shield visible light with the transmittance thereof being 1% or less.

Furthermore, it was possible to form the thickness of the film of titanium thinner than that (approximately 5 µm) of the connector formed in the printing step.

INDUSTRIAL APPLICABILITY

An embodiment of the present invention may be applicable to mobile phones, smart phones, tablets, laptop PCs with a touch function, touch panels built in vending machines with a touch function, and optical thin film substrates.

DESCRIPTION OF REFERENCE NUMERAL

M: touch panel, C: cover substrate, D: color layer (connector), D1: high refractive index layer, D2: low refractive index layer, E: edge region, P: touch panel substrate, S: shield layer (connector), S2: dielectric layer, S1: metal layer, T: display area

What is claimed is:

1. A touch panel comprising:
   a cover substrate;
   a connector being provided on an area of the cover substrate other than a display area, and comprising a color layer and a shield layer, the shield layer being formed from a multilayer structure, shielding visible light, and not shielding radio waves, the multilayer structure being configured so that a plurality of metal layers and a plurality of dielectric layers which is thicker than the metal layer are alternately laminated; and
   a touch panel substrate being arranged to face the cover substrate with the connector interposed therebetween, wherein
   the multilayer structure is configured such that each metal layer has a thickness of 0.5 nm to 5 nm, each dielectric layer has a thickness of 1 nm to 10 nm, which is 2 to 10 times that of each metal layer, a total thickness of the metal layers is equal to or greater than 50 nm, and a total thickness of the dielectric layers is equal to or greater than 200 nm, and
   the color layer, the shield layer, and the touch panel substrate are laminated on the cover substrate in this order.

2. The touch panel according to claim 1, wherein
   the color layer is formed from a multilayer structure configured so that a high refractive index layer and a low refractive index layer are alternately laminated.

3. The touch panel according to claim 2, wherein
   at least one of the low refractive index layer and the high refractive index layer comprises a metal element.

4. A method of producing a touch panel, comprising:
   preparing a cover substrate;
   forming a color layer on an area of the cover substrate other than a display area in a vacuum:
   forming a shield layer which shields visible light and does not shield radio waves on the color layer in a vacuum, the shield layer having a multilayer structure obtained by alternately laminating a plurality of dielectric layers and a plurality of metal layers so that the dielectric layer is thicker than the metal layer and setting a thickness of each metal layer to be 0.5 nm to 5 nm, a thickness of each dielectric layer to be 1 nm to 10 nm, which is 2 to 10 times that of each metal layer, a total thickness of the metal layers to be equal to or greater than 50 nm, and a total thickness of the dielectric layers to be equal to or greater than 200 nm; and
   adhering a touch panel substrate onto the shield layer.

5. An optical thin film substrate, comprising:
   a substrate;
   a color layer being provided on the substrate; and
   a shield layer being provided on the color layer and formed from a multilayer structure configured so that a plurality of metal layers and a plurality of dielectric layers which is thicker than the metal layer are alternately laminated, the shield layer shielding visible light and not shielding radio waves, wherein
   the multilayer structure is configured such that each metal layer has a thickness of 0.5 nm to 5 nm, each dielectric layer has a thickness of 1 nm to 10 nm, which is 2 to 10 times that of each metal layer, a total thickness of the metal layers is equal to or greater than 50 nm, and a total thickness of the dielectric layers is equal to or greater than 200 nm, and the color layer and the shield layer are laminated on the substrate in this order.

6. The optical thin film substrate according to claim 5, wherein the color layer is formed from a multilayer structure configured so that a high refractive index layer and a low refractive index layer are alternately laminated.

7. The optical thin film substrate according to claim 6, wherein at least one of the low refractive index layer and the high refractive index layer comprises a metal element.

8. The optical thin film substrate according to claim 5, wherein the substrate is a glass substrate or a resin substrate.

9. A method of producing an optical thin film substrate, comprising:

preparing a substrate;

forming a color layer on the substrate in a vacuum: and forming a shield layer on the color layer in a vacuum, the shield layer having a multilayer structure obtained by alternately laminating a plurality of dielectric layers and a plurality of metal layers so that the dielectric layer is thicker than the metal layer which has a thickness of 0.5 nm to 5 nm and setting a thickness of each metal layer to be 0.5 nm to 5 nm, a thickness of each dielectric layer to be 1 nm to 10 nm, which is 2 to 10 times that of each metal layer, a total thickness of the metal layers to be equal to or greater than 50 nm, and a total thickness of the dielectric layers to be equal to or greater than 200 nm.

* * * * *